Nov. 18, 1947.　　C. W. H. MINCHIN　　2,431,067
DYNAMOELECTRIC MACHINE
Filed Dec. 30, 1944
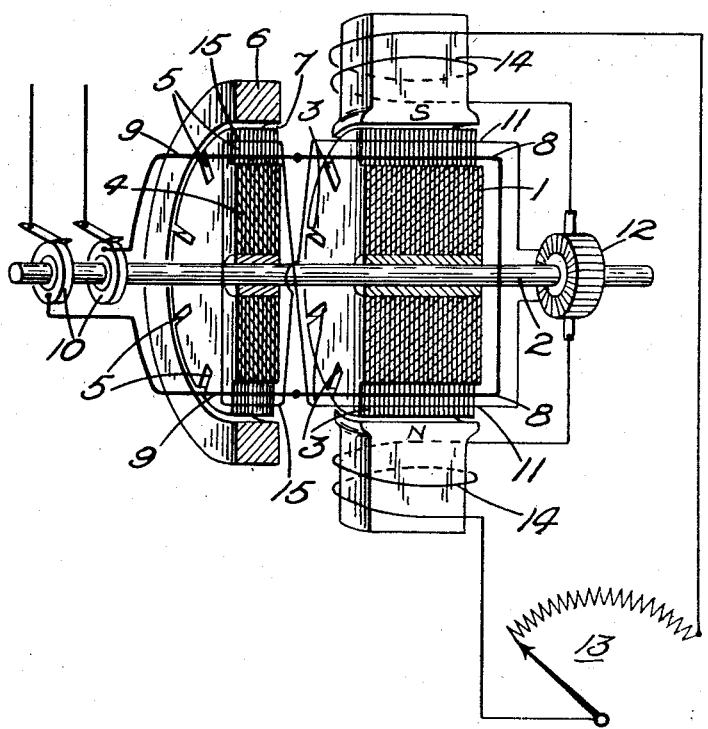
Inventor
Cecil William Haviland Minchin
By Peck & Peck
Attnys Patented Nov. 18, 1947

2,431,067

UNITED STATES PATENT OFFICE 2,431,067

DYNAMOELECTRIC MACHINE

Cecil William Haviland Minchin, Dursley, England, assignor to Mawdsley's Limited, Dursley, England, a company of England Application December 30, 1944, Serial No. 570,612
In Great Britain January 12, 1944

6 Claims. (Cl. 171—119)

This invention relates to self-excited alternating current dynamoelectric machines and more particularly to machines which have compensating devices, for example, to control the terminal voltage of a self-excited alternator or the power factor of a self-excited synchronous motor.

Such a self excited machine has an armature which rotates between stationary field magnet poles, and is provided with two separate windings, namely, (1) an alternating current winding connected to slip rings and (2) a direct current winding connected to a commutator. The poles are excited by a field winding connected to the commutator brushes and the alternating terminal voltage output is generally controlled by the adjustment of a field rheostat which is connected in series with the field winding. With constant setting of the field rheostat and constant speed the terminal output voltage of the alternator will fall with increasing load, this phenomenon being more pronounced when the load current is at low lagging power factor than when at nearer unity or leading power factor.

The reason for this drop in terminal output voltage is due chiefly to the magnetomotive force of armature reaction causing distortion of and opposing the magnetomotive force of the field poles. When the alternator is loaded at unity power factor the M. M. F. of the armature reaction is nearly at ninety electrical degrees to the M. M. F. of the field poles. This leads to distortion of the main field and results in a small drop in terminal output voltage. When the alternator is loaded at zero lagging power factor the M. M. F. of armature reaction is nearly in direct opposition to the M. M. F. of the field poles. This leads to considerable decrease in total M. M. F. and a greater drop in terminal output voltage.

If the terminal voltage is to be kept constant at constant speed then the direct current excitation must be increased with either increasing load at given power factor or with decreasing lagging power factor at a given load.

It is the object of the present invention to provide means by which at constant speed the direct current excitation of an alternator of this type will be automatically varied so that the terminal output voltage of the alternator will be maintained substantially constant over a wide range of load and power factor without adjustment of a field rheostat.

According to the present invention a self-excited alternating current dynamoelectric machine comprises a main armature and field magnets, an alternating current winding and a direct current winding on the armature, a second armature fixed relatively to the main armature, a continuous unwound member of magnetic material arranged with a radial air gap in relation to said second armature, an alternating current winding on the second armature arranged for the same number of phases and poles as and connected in series with that on the main armature, a direct current winding on the second armature connected in series with and arranged at 180 electrical degrees in relation to that on the main armature, a commutator to which the direct current windings are connected and windings on the field magnets connected to the commutator brushes.

One form of self-excited dynamoelectric machine, namely an alternator, will now be described by way of example with reference to the accompanying partly diagrammatic sectional drawing.

I is the main rotating armature fixed on a shaft 2 to rotate between the field magnet poles S, N. One pair of field magnet poles are indicated but a machine may have more than one pair depending on its characteristics as will be understood. The armature has the usual slots 3 to accommodate the windings. A second armature 4 having slots 5 is also fixed on the shaft 2 close to the armature I. The number of slots is preferably the same as that of the armature I. The armature 4 rotates within a stationary continuous unwound member of magnetic material 6 from which it is separated by a small even radial gap 7. 8 indicates the alternating current winding of the alternator wound in the slots 3 of the armature I. It is of usual form and is connected to a similar winding 9 arranged for the same number of phases and poles as the winding 8 wound in the slots 5 of the second armature 4 so that the two windings are in series. Each side of a coil wound in the slots 5 may be an extension of a side of a coil wound in the slots 3. The ends of the two windings are brought out to the slip rings 10. As the second armature 4 is entirely separated magnetically from the field magnet poles S, N of the main armature I when the alternator is supplying current at any given power factor and load the winding on the armature 4 produces a magnetic field which is stationary in space and the magnetomotive force producing this field is in direct proportion to the alternating current flowing in the winding. The magnetic circuit of this second armature 4 and its unwound member 6 is so proportioned that very little magnetic saturation occurs and consequently the strength of the magnetic flux in this second field system is almost directly proportional to the load current of the alternator.

When the alternator is loaded at zero lagging power factor the direction of the magnetic flux in the second armature 4 will be almost in direct opposition to the direction of the magnetic flux produced by the main field magnets S, N.

The direct current winding of the main alternator armature 1 is indicated at 11 wound also in the slots 3 and it is connected to a similar direct current winding 15 wound in the slots 5 of the second armature so that the two windings are in series and in such a way that they are relatively staggered through 180 electrical degrees. The ends of these two windings are brought out to a commutator 12, the brushes of which are connected through a rheostat 13 to the field magnet windings 14. The winding 15 cuts the stationary field and there is thereby produced a direct current voltage and this voltage will increase with increase of load alternating current and, provided the brushes are fixed, will also vary as the flux in the unwound member changes its position. Thus at zero lagging power factor the voltage generated in that part of the direct current armature winding wound on the second armature 4 will assist the voltage generated in that part of the direct current armature winding wound on the main armature 1.

When the machine is generating full load current at a higher power factor than zero lagging the total magnetic flux through the second armature 4 will be the same as when the alternator is loaded at full load current at zero lagging power factor. The voltage generated in that part of the direct current armature winding wound on the second armature, however, will not be so great as when the machine is loaded at zero lagging power factor, due to the altered direction of the magnetic flux through the second armature 4 in relation to the brushes. Moreover, this voltage will fall as the power factor is increased to unity. If the machine be loaded with a leading power factor current the voltage generated in that part of the direct current armature winding wound on the second armature may oppose the voltage generated in that part of the direct current armature winding wound on the main armature.

Thus the variation in value and direction of the voltage generated in that part of the direct current armature winding wound on the second armature 4 is such that at constant speed and with a constant setting of the field rheostat 13 the main field current will be automatically increased or decreased under varying load conditions in such manner that the increased or decreased M. M. F. produced by the main field magnet windings 14 will tend to maintain the alternating terminal voltage constant.

The alternating current and direct current windings may be disposed in separate slots as will be understood.

When designing the winding of the second armature 4 it is necessary to take into account the extra drop in alternating terminal voltage which is due to ohmic resistance and inductance.

A correctly designed machine of this type will, when running at constant speed, maintain the alternating terminal voltage substantially constant over a wide range of load and power factor.

The machine can also be designed to maintain the terminal voltage substantially constant over the same range of load and power factor allowing for the inherent speed variation of the prime mover, or, to increase the terminal voltage with increasing load in a manner similar to the effect produced by an overcompounded direct current generator.

For optimum results the number of turns of the alternating current winding 9 and direct current winding on the second armature 4 may not be identical with those on the main armature.

In some cases it may be advantageous to employ an uneven air gap between the second armature 4 and the stationary unwound member 6 of magnetic material.

In a further modification of the invention the member 6 of magnetic material may rotate with the armature.

It will be understood that the arrangements described above will be exactly similar for a self-excited synchronous motor. The power factor of the synchronous motor at various loads will then be controlled automatically by variation of the field strength of the motor.

What I claim is:

1. A self-excited alternating current dynamo-electric machine comprising a main armature and field magnets, an alternating current winding and a direct current winding on the armature, a second armature fixed relatively to the main armature, a continuous unwound member of magnetic material arranged with a radial air gap in relation to said second armature, an alternating current winding on the second armature arranged for the same number of phases and poles as and connected in series with that on the main armature, a direct current winding on the second armature connected in series with and arranged at 180 electrical degrees in relation to that on the main armature, a commutator to which the direct current windings are connected and windings on the field magnets connected to the commutator brushes.

2. A self-excited alternating current dynamo-electric machine comprising a shaft, a main armature fixed on the shaft, field magnets, an alternating current winding and a direct current winding on the armature, a second armature fixed on the shaft, a continuous fixed unwound member of magnetic material arranged with a radial air gap in relation to said second armature, an alternating current winding on the second armature arranged for the same number of phases and poles as and connected in series with that on the main armature, a direct current winding on the second armature connected in series with and arranged at 180 electrical degrees in relation to that on the main armature, a commutator to which the direct current windings are connected and windings on the field magnets connected to the commutator brushes.

3. A self-excited alternating current dynamo-electric machine comprising a main armature and field magnets, an alternating current winding and a direct current winding on the armature, a second armature fixed relatively to the main armature, a continuous unwound member of magnetic material arranged with an even radial air gap in relation to said second armature, an alternating current winding on the second armature arranged for the same number of phases and poles as and connected in series with that on the main armature, a direct current winding on the second armature connected in series with and arranged at 180 electrical degrees in relation to that on the main armature, a commutator to which the direct current windings are connected and windings on the field magnets connected to the commutator brushes.

4. A self-excited alternating current dynamo-electric machine comprising a shaft, a main armature fixed on the shaft, field magnets, an alternating current winding and a direct current winding on the armature, a second armature fixed on the shaft, a continuous fixed unwound member of magnetic material arranged with an even radial air gap in relation to said second armature, an alternating current winding on the second armature arranged for the same number of phases and poles as and connected in series with that on the main armature, a direct current winding on the second armature connected in series with and arranged at 180 electrical degrees in relation to that on the main armature, a commutator to which the direct current windings are connected and windings on the field magnets connected to the commutator brushes.

5. A self-excited alternating current dynamo-electric machine comprising a main armature and field magnets, an alternating current winding and a direct current winding on the armature, a second armature fixed relatively to the main armature, a continuous unwound member of magnetic material arranged with a radial air gap in relation to said second armature, the magnetic circuit of the second armature and the unwound member being such that little magnetic saturation occurs, an alternating current winding on the second armature arranged for the same number of phases and poles as and connected in series with that on the main armature, a direct current winding on the second armature connected in series with and arranged at 180 electrical degrees in relation to that on the main armature, a commutator to which the direct current windings are connected and windings on the field magnets connected to the commutator brushes.

6. A self-excited alternating current dynamo-electric machine comprising a shaft, a main armature fixed on the shaft, field magnets, an alternating current winding and a direct current winding on the armature, a second armature fixed on the shaft, a continuous fixed unwound member of magnetic material arranged with a radial air gap in relation to said second armature, the magnetic circuit of the second armature and the unwound member being such that little magnetic saturation occurs, an alternating current winding on the second armature arranged for the same number of phases and poles as and connected in series with that on the main armature, a direct current winding on the second armature connected in series with and arranged at 180 electrical degrees in relation to that on the main armature, a commutator to which the direct current windings are connected and windings on the field magnets connected to the commutator brushes.

CECIL WILLIAM HAVILAND MINCHIN.

REFERENCES CITED

The following references are of record in the file of this patent:

UNITED STATES PATENTS

| Number | Name | Date |
| --- | --- | --- |
| 431,235 | Shallenberger | July 1, 1890 |
| 1,614,092 | Weichsel | Jan. 11, 1927 |
| 1,697,362 | Kostko | Jan. 1, 1929 |
| 2,320,602 | Hutchinson | June 1, 1943 |
| 637,349 | Rosenqvist | Nov. 21, 1890 |
| 438,602 | Bradley | Oct. 21, 1890 |